United States Patent [19]
Burgett et al.

[11] Patent Number: 5,982,357
[45] Date of Patent: Nov. 9, 1999

[54] COMPUTER KEYBOARD SYSTEMS AND METHODS FOR DETERMINING EXCESSIVE KEY STROKE FORCE

[75] Inventors: David A. Burgett, Newman Lake; Jeff Gibson, Spokane, both of Wash.

[73] Assignee: Key Tronic Corporation, Spokane, Wash.

[21] Appl. No.: 08/820,407

[22] Filed: Mar. 12, 1997

[51] Int. Cl.[6] .................................................. G09G 5/00
[52] U.S. Cl. ............................ 345/168; 345/172; 341/22
[58] Field of Search ........................... 400/704; 345/168, 345/172; 341/22, 24, 27, 20

[56] References Cited

U.S. PATENT DOCUMENTS

| | | |
|---|---|---|
| 1,798,385 | 3/1931 | Roth . |
| 2,348,744 | 5/1944 | McMurry . |
| 2,717,688 | 9/1955 | Brooks . |
| 2,856,052 | 10/1958 | Luhn . |
| 4,281,579 | 8/1981 | Bennett ..................................... 84/478 |
| 4,323,888 | 4/1982 | Cole ....................................... 340/365 |
| 4,493,237 | 1/1985 | DeLong ..................................... 84/62 |
| 4,621,334 | 11/1986 | Garcia ..................................... 382/115 |
| 4,644,841 | 2/1987 | Nagashima ................................ 84/615 |
| 4,805,222 | 2/1989 | Young ..................................... 382/115 |
| 5,424,730 | 6/1995 | Sasaki ....................................... 341/25 |
| 5,557,686 | 9/1996 | Brown ..................................... 382/115 |

FOREIGN PATENT DOCUMENTS

0 768 598 A1  4/1997  European Pat. Off. ........ G06F 3/023

*Primary Examiner*—Amare Mengistu
*Assistant Examiner*—Mansour M Said
*Attorney, Agent, or Firm*—Wells, St. John, Roberts Gregory & Matkin P.S.

[57] ABSTRACT

Computer keyboard systems and methods of determining excessive keystroke force or overpressure are described. A computer keyboard system 10 is illustrated having a keyboard array of keys 14. Individual keys 14 are capable of being reciprocated through a keystroke range which comprises an undepressed position and an actuation position. The keystroke range may also include an overtravel subrange. Individual keys 14 are operatively connected with individual keyswitches 32 which are activated thereby for providing informational signals to a keyboard microprocessor 54, 56. The microprocessor is configured to determine a keyswitch closure duration value and compare that value with a predetermined threshold duration value. If the closure duration value is greater than the predetermined threshold duration value, then an overpressure signal is produced which enables a sensory warning device 50, 52 to warn the keyboard operator that excessive force has been applied.

36 Claims, 10 Drawing Sheets

COMPUTER KEYBOARD SYSTEMS AND METHODS FOR DETERMINING EXCESSIVE KEY STROKE FORCE

TECHNICAL FIELD

This invention relates to computer keyboards having features to monitor excessive keystroke force applied by an operator.

BACKGROUND OF THE INVENTION

There is evidence to suggest computer keyboard operators, particularly those that do extensive word processing, who apply key actuation forces far in excess of that required to actuate the keyswitches, are more likely to become fatigued and acquire symptoms of Repetitive Stress Syndrome.

Consequently one of the objectives and advantages of this invention is to provide a low cost computer keyboard system for monitoring actuation forces being applied to the keyboard keys and for notifying the operator when excessive force or "overforce" is being used.

These and other objectives and advantages will become apparent upon reviewing the following detailed description of a preferred embodiments of this invention in conjunction with the drawings.

BRIEF DESCRIPTION OF THE DRAWINGS

Preferred embodiments of the invention are described below with reference to the following accompanying drawings.

FIG. 7 is a plan view of a computer keyboard system incorporating the present invention and showing one grouping of keys in a computer keyboard array of keys.

FIG. 9 is a plan view of a computer keyboard system incorporating the present invention and showing a different grouping of keys in a computer keyboard array of keys.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
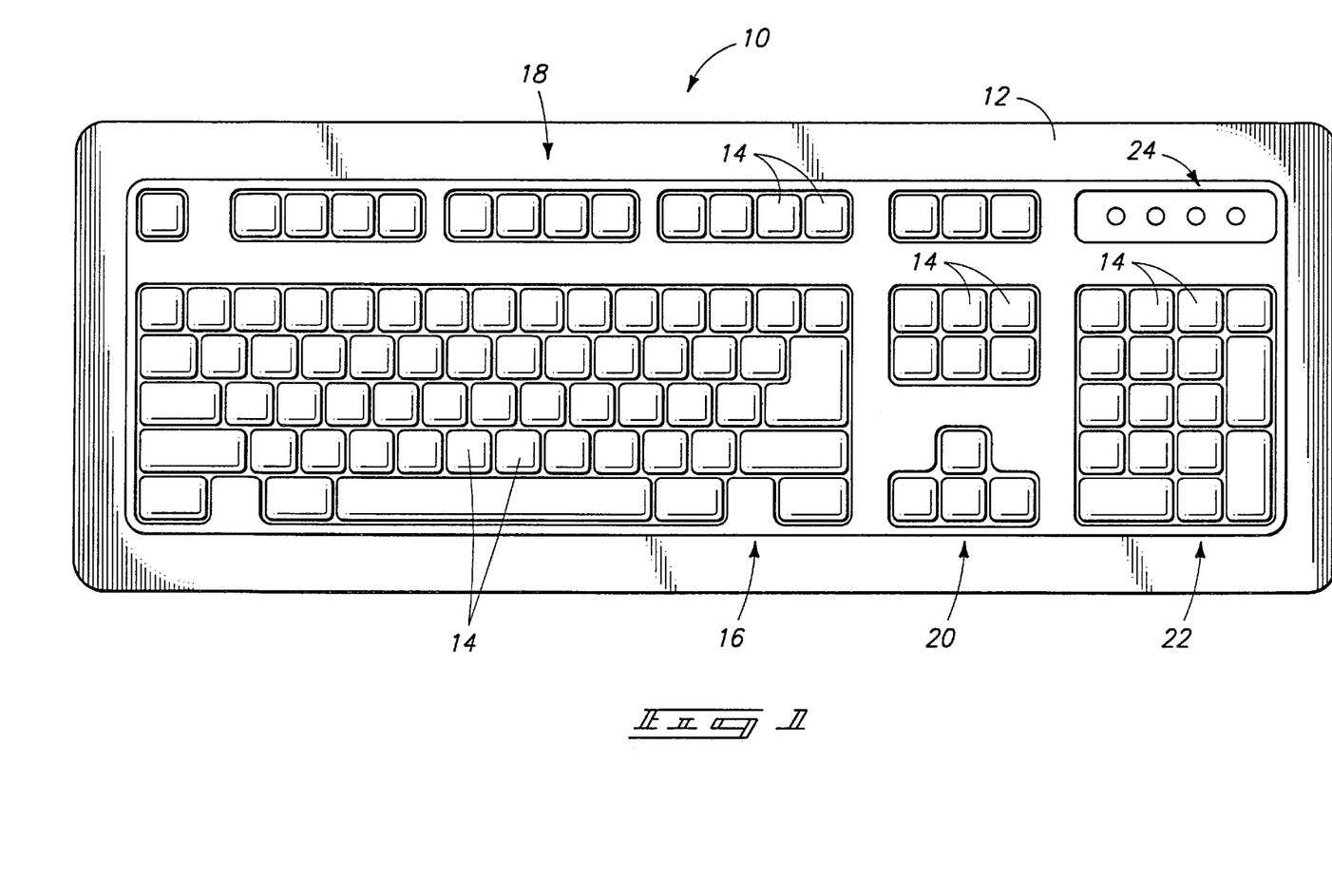
FIG. 1 is a plan view of a computer keyboard system incorporating the present invention showing a computer keyboard array of keys.

Referring to FIG. 1, a computer keyboard system with which the present invention may be used is indicated generally at 10. The computer keyboard system 10 includes a keyboard housing 12 for receiving a plurality of keyboard keys 14. The computer keyboard system 10 includes keyboard keys 14 that are arranged in a keyboard array having an alphanumeric section 16, a function key section 18, a cursor control section 20, and a calculator keypad section 22. Computer keyboard system 10 may include a sensory warning device 24 for supplying visual warning signals to the computer operator. Exemplary devices include visual indicators such as LED sections. Exemplary devices may also include other discernable indicators which are not necessarily visual in nature. For example, device 24 may include audible indicators as well, as will become apparent from the discussion below.

Generally all of the illustrated computer keyboard keys 14 are of the same general structure; however, that is not necessary.

Figure 2:
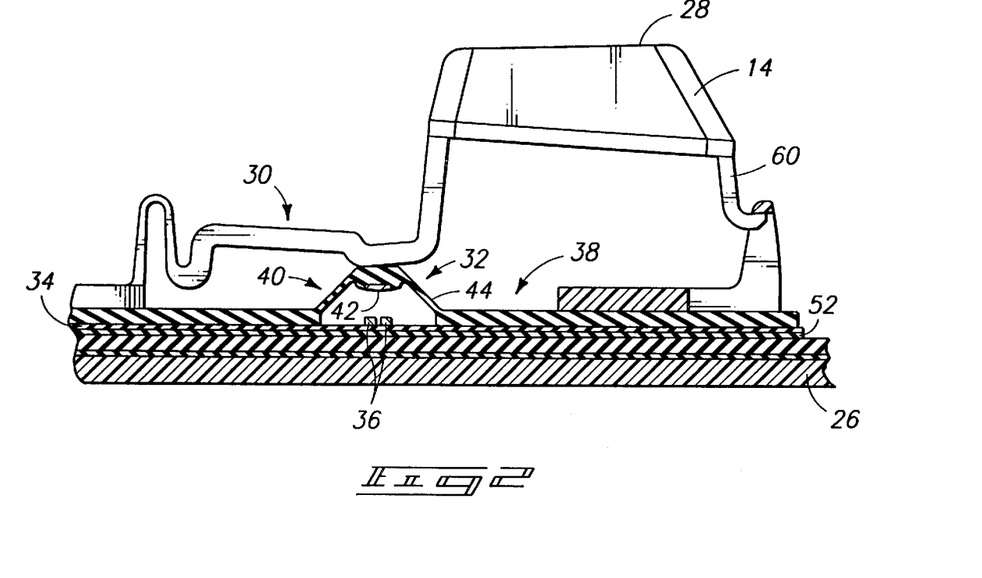
FIG. 2 is a fragmentary vertical cross-section view of a typical key having a digital informational membrane keyswitch showing the key in the undepressed position.
Figure 3:
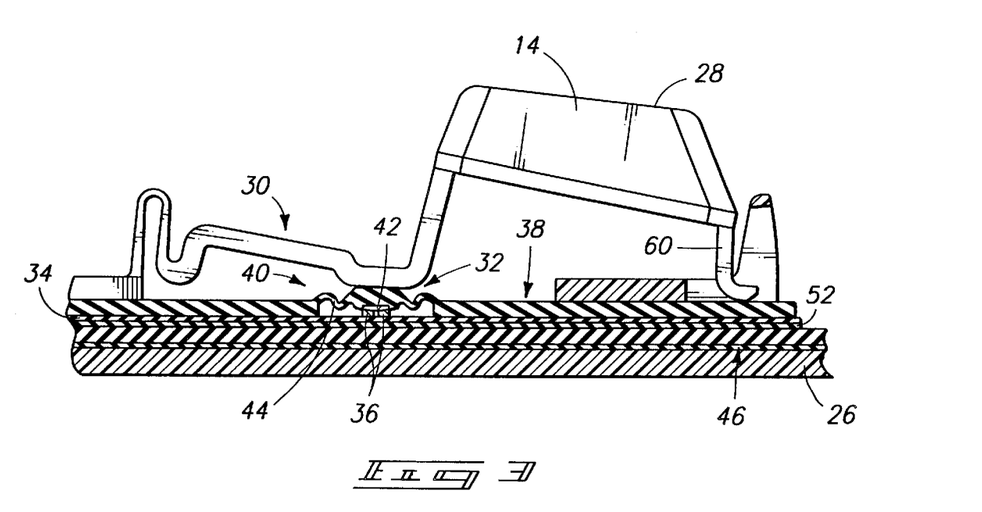
FIG. 3 is a fragmentary vertical cross-sectional view similar to FIG. 2, except showing the key in the depressed position.

Referring to FIGS. 2 and 3, one specific type of key structure is shown. The description which follows is not intended to limit the invention in any way, but is merely provided to illustrate an illustrative key type with which the invention can be used. Other key types may, of course, be used. The computer keyboard system 10 includes a general base or back plate 26 that generally supports the keys 14. Each of the keys includes a keytop 28 that is supported by a keytop support 30. In the illustrated example, the keytop support 30 is in the form of a key lever. More detail of the key lever structure may be found in U.S. Pat. No. 5,329,079, granted Jul. 12, 1994, and assigned to Key Tronic Corporation, the same assignee as the present invention.

Each key 14 includes a digital membrane keyswitch 32 that generates a computer digital input electrical signal when activated. The digital membrane keyswitch 32 includes a flexible membrane layer 34 that has a printed circuit formed thereon that has digital switch contacts 36 at each key location. The keyswitch structure includes a return spring means 38 for biasing the keytop 28 to an "up" or undepressed position. In the illustrated example, the return spring means 38 includes an elastomeric dome sheet having individual elastomeric domes 40 at each switch location. Other types of return spring means are, of course, possible. Other types of keyswitches are possible as well.

FIG. 2 shows the keytop in the undepressed position with the dome 40 biasing the keytop to its undepressed position. FIG. 3 shows the depression of the keytop with the dome 40 collapsed to activate the digital membrane keyswitch 32. The elastomeric dome 40 carries an electrical contact 42 that, when in contact with the switch contacts 36, generates the computer digital input electrical signal indicating that the key 14 has been activated. Each of the elastomeric domes 40 includes a flexible wall 44 that is bendable as shown in FIG. 3. When the operator removes the activating pressure or force, the dome 40 returns to its original position illustrated in FIG. 2, lifting the keytop to its undepressed position. The above is but one key construction which can be utilized in accordance with the invention. Other key constructions are possible.

Individual keys 14 are capable of reciprocation by a keyboard operator through a keystroke range which comprises an undepressed position (FIG. 2) and an actuation position (FIG. 3). In accordance with one aspect of the invention, the keystroke range includes a so-called overtravel subrange or zone. The overtravel subrange is a range through which a key can be moved which occurs directly after closure of an associated keyswitch, such as keyswitch 32. Accordingly, the overtravel subrange is generally beyond the actuation position and away from the undepressed position discussed above. Travel through the overtravel subrange maintains closure of an associated keyswitch until the operator's finger momentum stops and begins to rebound. During a period of rebound, an associated key is moved reciprocally back through the overtravel subrange and toward the actuation position. Passage past the actuation position and toward the undepressed position opens the associated keyswitch. In accordance with another aspect of the invention, the keystroke range does not include a substantial or meaningful overtravel subrange or zone. Rather, the keystroke range includes a so-called "hard stop". Such "hard stop" refers to a keystroke range in which the key stops generally at the actuation position or shortly thereafter.

It has been discovered that the force with which a key is depressed correlates to the time that a keyswitch is closed. Through utilization of keyswitch closure duration data, one can ascertain a measure of the force with which a particular key is depressed. Keyswitch closure duration data may be gathered and analyzed by an on-board keyboard microprocessor. Such data may be gathered and analyzed by other means as well. By comparing particular keyswitch closure times with known or predetermined threshold duration values, one can ascertain whether an excessive force or overforce is being utilized to depress a particular key. Responsive to a detected overforce, a keyboard operator may be appropriately notified that excessive force is being used and remedial measures can be taken by the operator to ensure that the keyboard operator does not stress their hands, fingers, or muscles.

Figure 4:
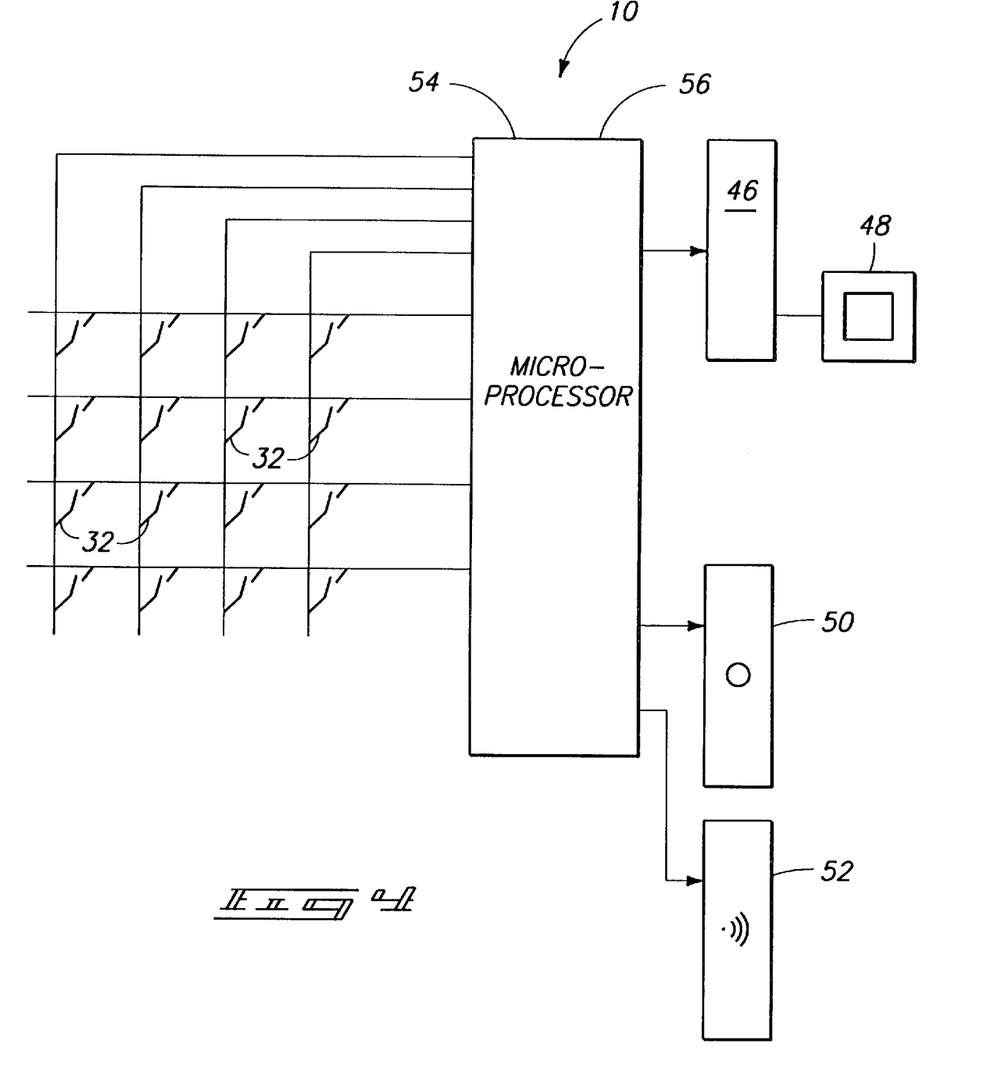
FIG. 4 is an abbreviated electrical schematic of a keyboard incorporating the digital informational keyswitches illustrated in FIG. 2.

Referring to FIG. 4, an electronic block diagram or schematic of the computer keyboard system 10 is shown. System 10 can be operatively connected to a host computer 46, which in turn can be connected to a computer monitor 48. Computer keyboard system 10 further includes a sensory warning device. Exemplary sensory warning devices, as mentioned above, can include an LED display 50 and/or an audible warning device or buzzer 52. Such warning devices constitute means through which a keyboard operator is provided with a discernable input which indicates that an overforce pressure has been applied to a key as will become apparent below. Other sensory warning devices can, of course, be provided such as through monitor 48. For example, monitor 48 may be made to produce a visual warning signal such that the keyboard operator need not look down to be warned of an excessive force condition.

Shown also in FIG. 4 are a plurality of exemplary keyswitches 32. Keyswitches 32 are operably associated with individual respective keys 14 (FIG. 1) and generate a computer input signal when the keyboard operator applies an actuation force which is sufficient to move an individual key from the undepressed position (FIG. 2) to the actuation position (FIG. 3). The actuation position corresponds to closure of an associated keyswitch.

In accordance with one implementation of the invention, a microprocessor is configured as a keyswitch monitor 54. Keyswitch monitor 54 is operably connected with the plurality of keyswitches 32 and is configured to determine a keyswitch closure duration value upon closure of an associated keyswitch. In accordance with this implementation, the keystroke range through which a key travels can, but need not include an overtravel subrange. This is because the keyswitch monitor 54 is configured to measure the amount of time that a particular keyswitch is closed. The amount of time a particular keyswitch is closed is, in this implementation, equal to the keyswitch closure duration value. The keyswitch monitor 54 is also preferably configured to generate an overpressure signal if the keyswitch closure duration value exceeds a predetermined threshold duration value for the associated keyswitch. An exemplary value for the predetermined threshold duration value is less than around 100 ms. Sensory warning devices 50, 52 are operably connected with keyswitch monitor 54 and are configured to receive the overpressure signal and responsive thereto warn the keyboard operator that an excessive force has been applied to a particular key.

Figure 5:
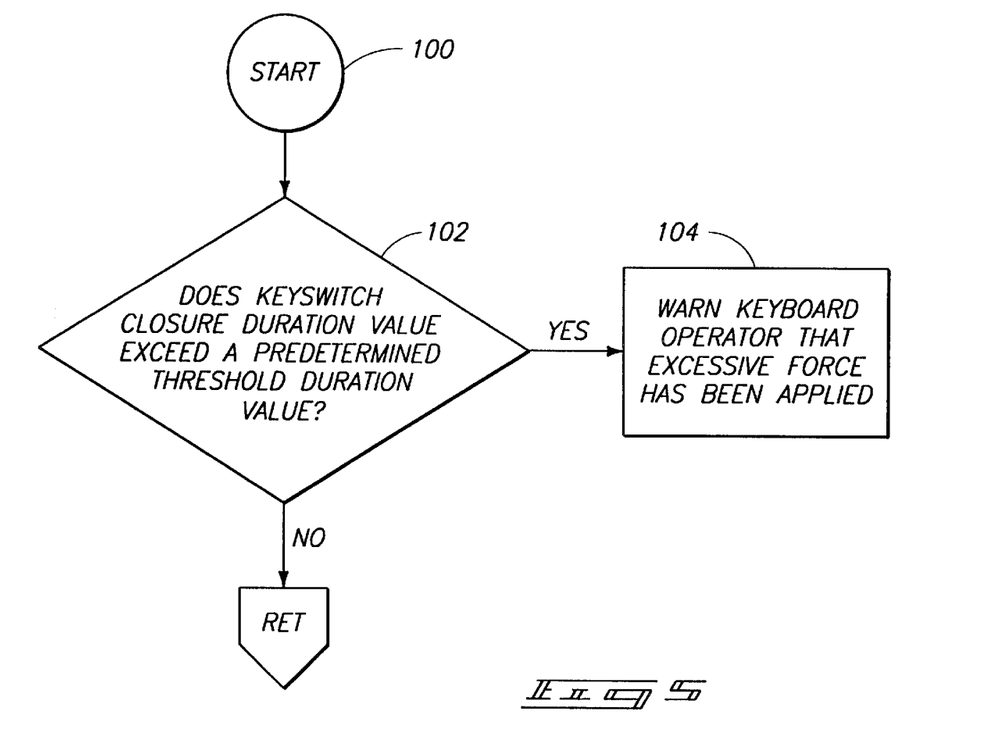
FIG. 5 is a simplified microprocessor program flow diagram in accordance with one implementation for notifying a keyboard operator that excessive force has been applied to a key or keys.

In accordance with this implementation, an abbreviated subroutine of a microprocessor computer program flow diagram is illustrated in FIG. 5. From a start step 100, the subroutine moves to a decision step 102 in which the keyswitch closure duration value is compared against a predetermined threshold time or threshold duration value. Suitable memory may be, and preferably is provided relative to keyswitch monitor 54 for holding or allowing threshold duration values to be stored. If the keyswitch closure duration value exceeds the predetermined threshold duration value, then the keyboard operator is warned at step 104 that an excessive force has been applied. Such warning is effectuated through the above-described sensory warning devices. If however, at step 102, the keyswitch closure duration value does not exceed the predetermined threshold duration value, then the keyboard operator is not warned and the subroutine returns to the main routine. Different keys of the keyboard can have different associated predetermined threshold duration values and can be organized into specific groups as will become apparent below.

In accordance with another implementation of the invention, keyswitch monitor 54 is configured to measure or determine a keyswitch closure duration value and generate an overpressure signal if the keyswitch closure duration value is greater than a first value and less than a second value which is greater than the first value. An exemplary first value can correspond to the predetermined threshold duration value mentioned above. Each key 14 can be assigned an associated first value (which may be the same or different). The second value can, and preferably does correspond to a value which is associated with a repeat key function. That is, keyboards generally have a so-called repeat key function which determines whether a particular key has been depressed for a period of time which is sufficient to indicate that the operator intends to have a key character repeated. In this implementation, the keyswitch monitor 54 checks the measured keyswitch closure duration value against the first and second values, and generates an overpressure signal only if the measured value falls between the first and second values. Preferably, a plurality of first values are stored in memory which is accessible by the keyswitch monitor 54. Preferably such memory is, but need not be, an integral part of the computer keyboard system 10. Such memory can take the form of read-only memory (ROM), programmable read-only memory (PROM), random access memory (RAM), and the like. In one implementation, a memory look-up table can be used for storing first values. Such a look-up table can be readily accessed by the keyswitch monitor 54 for making the comparisons mentioned above.

Figure 6:
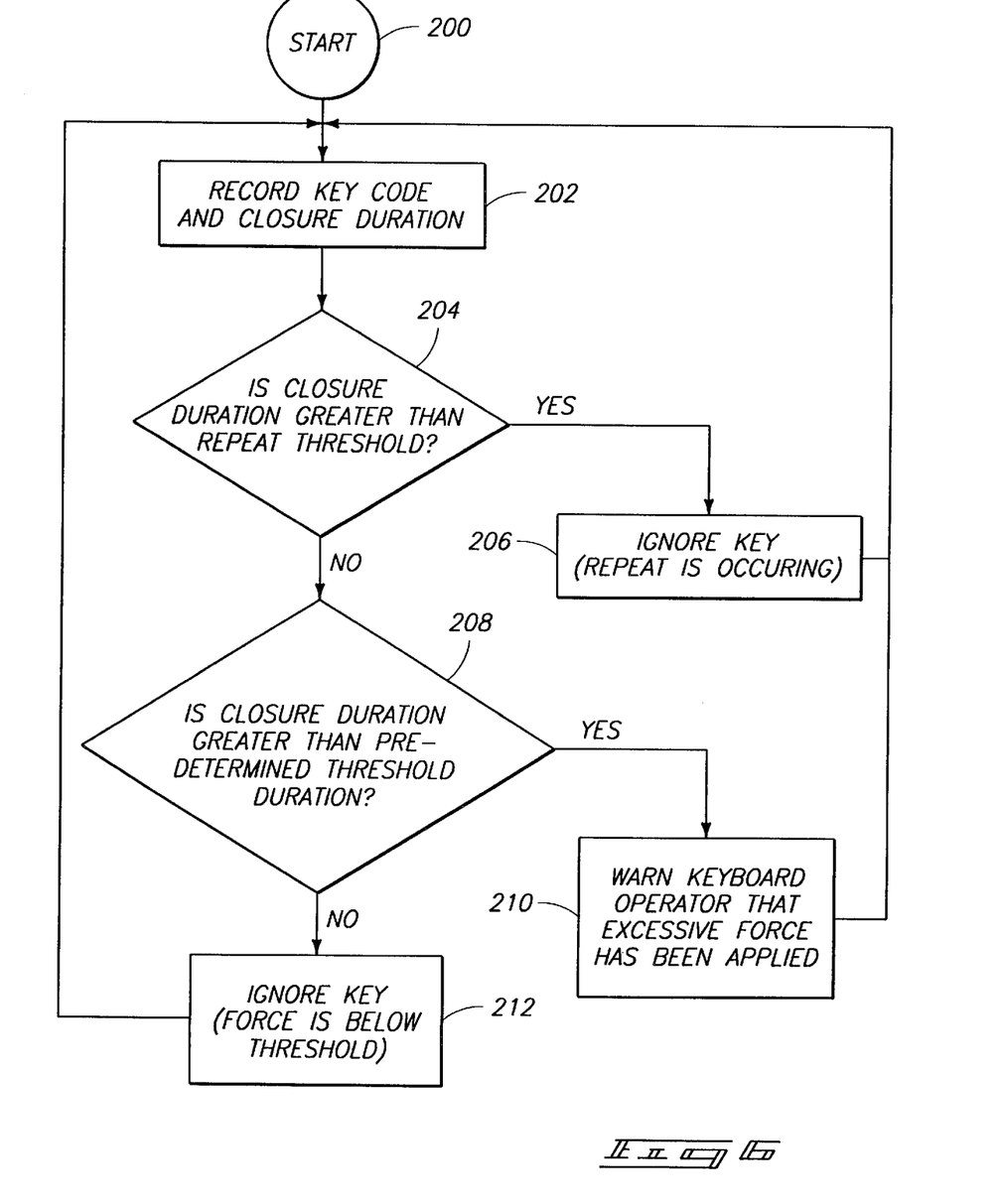
FIG. 6 is a simplified microprocessor program flow diagram in accordance with another implementation for notifying a keyboard operator that excessive force has been applied to a key or keys.

An abbreviated subroutine of a microprocessor computer program flow diagram is illustrated in FIG. 6. From a start step 200, the subroutine moves to a step 202 at which a key code and a closure duration. The key code corresponds to each key's unique identifier which, as will be discussed below, can constitute not only a key identifier but also key group identifier. The closure duration corresponds to the above-described keyswitch closure duration value. At a decision step 204, a determination or comparison is made by the microprocessor as to whether the closure duration is greater than a repeat key threshold or second value mentioned above. If the closure duration is greater than the repeat threshold mentioned above, at step 206, such key input is ignored because a repeat function is occurring. If, however, the closure duration is not greater than the repeat threshold or second value, then at decision step 208 a determination is made as to whether the closure duration is greater than the predetermined threshold duration value or first value for the particular key. If so, then at step 210, the keyboard operator is warned that excessive force has been applied. If, however, such is not the case, then at step 212, the key input is ignored because the force is below the predetermined threshold duration. An exemplary value for the repeat threshold value is about 100 ms. Other values are possible and such values can be changed through suitable programming techniques.

Figure 11:
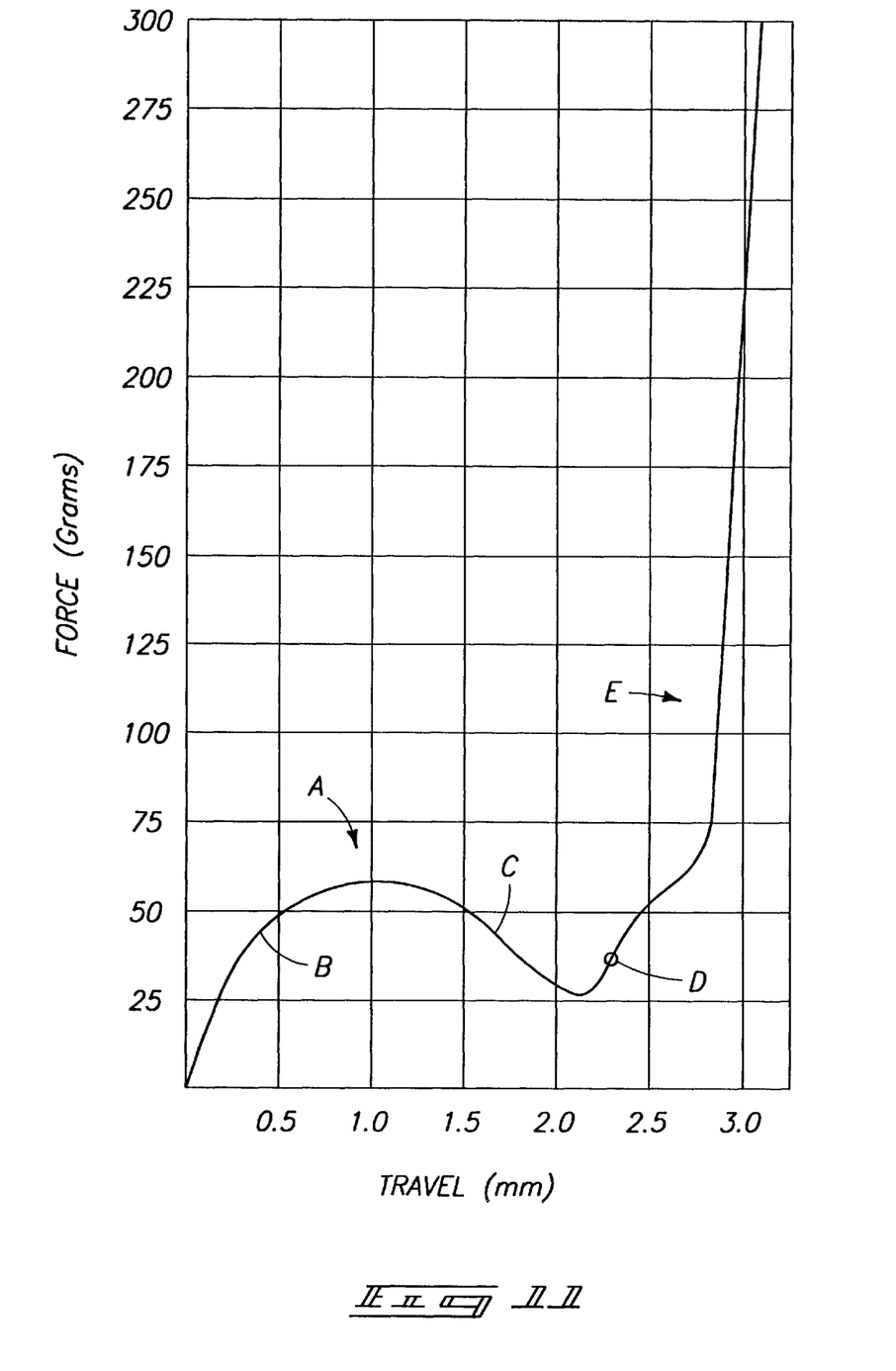
FIG. 11 is a schematic graph of the force-versus-stroke curve associated with a key showing a keyswitch actuation position and an overtravel subrange.

Referring to FIGS. 4 and 11, and in accordance with another implementation of the invention, the microprocessor is configured as an overtravel monitor 56. Overtravel monitor 56 is operatively connected with the plurality of keys 14 (FIG. 1) and is configured to measure an amount of time which corresponds to a time period during which an individual key is disposed within the overtravel subrange. Shown in FIG. 11 is a force-versus-stroke graph showing a force curve A that represents the force-versus-stroke (distance or keystroke range) relationship of the keys 14. Force curve A has an initial depression segment B in which the key is initially depressed a substantial distance by the keyboard user. Upon further depression, the keystroke range enters a breakover segment C in which the force required to further depress the key decreases. Such dramatic force change provides the operator with a tactile sensation that the keyswitch is being actuated to provide feedback to the operator that the operator has been successful in activating the keyswitch at activation or actuation position D. The keyswitch 32 is designed to generate the computer input signal at the actuation position D. Further downward movement of the key causes the key to move into and through the overtravel subrange E of the curve. It should be noted that the force required to move the key downward in the overtravel subrange E rapidly increases. Should the operator exert a force meaningfully greater than the force required to activate the keyswitch at point D, then the measured keyswitch closure duration value will indicate, when compared with the predetermined threshold duration values, that the key is disposed within the overtravel subrange for a duration of time which corresponds to an overforce or overpressure condition. Preferably, the overtravel monitor 56 is configured to generate an overpressure signal if, as with the above-described embodiment, the measured amount of time or keyswitch closure duration value is greater than a first value (threshold duration value) and less than a second value. The abbreviated microprocessor subroutine set forth in FIG. 6 is suitable for use with this implementation.

Briefly summarizing, systems and methods have been described thus far which enable a keyboard operator to be notified when an overpressure force has been applied to one or more keys of a computer keyboard. The systems and methods, in a preferred aspect, detect an overpressure force condition as a function of keyswitch closure time. This invention and its methodology are not limited to any one particular type of key construction. Accordingly, different types of keys and key constructions have been discussed. Exemplary keys and key constructions include those which have so-called "hard stops", and those which include overtravel subranges as described above. Other keys and key constructions are, of course, possible.

Additional aspects of present invention will be described just below. Before describing such aspects, however, some background information may be useful. When a keyboard operator types on a keyboard, the operator's fingers strike an associated key with a force which is directed by specific muscle groups of the hand and forearm. As the fingers of the hand differ, so too does the force with which each finger strikes a key. Such is the result of different respective governing muscles and muscle groups. The harder a finger strikes a key, the longer a key will be depressed. Additionally, in those keys in which overtravel is permitted, the harder a finger strikes a key, the more overtravel occurs as is apparent from the FIG. 11 force-versus-stroke graph. In such scenarios, a corresponding keyswitch closure duration value will be increased. Because keyswitch closure duration values can vary as a function of parameters such as: (1) which hand supports the fingers used to strike a particular key; (2) which finger is used to strike a particular key; (3) in which row a keys appears, and the like, it can be advantageous to assign different predetermined threshold values with such parameters in mind. Other parameters than the ones mentioned immediately above are possible.

Referring now to FIG. 7, certain keys within alphanumeric section 16 may be seen to be arranged or grouped in a plurality of different sub-groups of keys. In the illustrated example, sub-groups 58, 60, 62, 64, 66, 68, 70, and 72 may be seen. Sub-groups 64 and 66 constitute a first group of keys that are normally depressed by the operator's index fingers. Sub-group 64 corresponds to the "r", "t", "f", "g", "v", and "b" keys which are normally depressed by the left index finger. Sub-group 66 corresponds to the "y", "u", "h", "j", "n", and "m" keys which are normally depressed by the right index finger. Sub-groups 62 and 68 constitute a second group of keys that are normally depressed by the operator's middle fingers. Sub-group 62 corresponds to the "e", "d", and "c" keys which are normally depressed by the left middle finger. Sub-group 68 corresponds to the "i", "k", and "," keys which are normally depressed by the right middle finger. Sub-groups 60 and 70 constitute a third group of keys that are normally depressed by the operator's ring fingers. Sub-group 60 corresponds to the "w", "s", and "x" keys which are normally depressed by the left ring finger. Sub-group 70 corresponds to the "o", "l", and "." keys which are normally depressed by the right ring finger. Sub-groups 58 and 72 constitute a fourth group of keys that are normally depressed by the operator's little fingers. Sub-group 58 corresponds to the "q", "a", and "z" keys which are normally depressed by the left little finger. Sub-group 72 corresponds to the "p ", ";", and "/" keys which are normally depressed by the right little finger. As shown, each group or sub-group comprises different keys.

Figure 8:
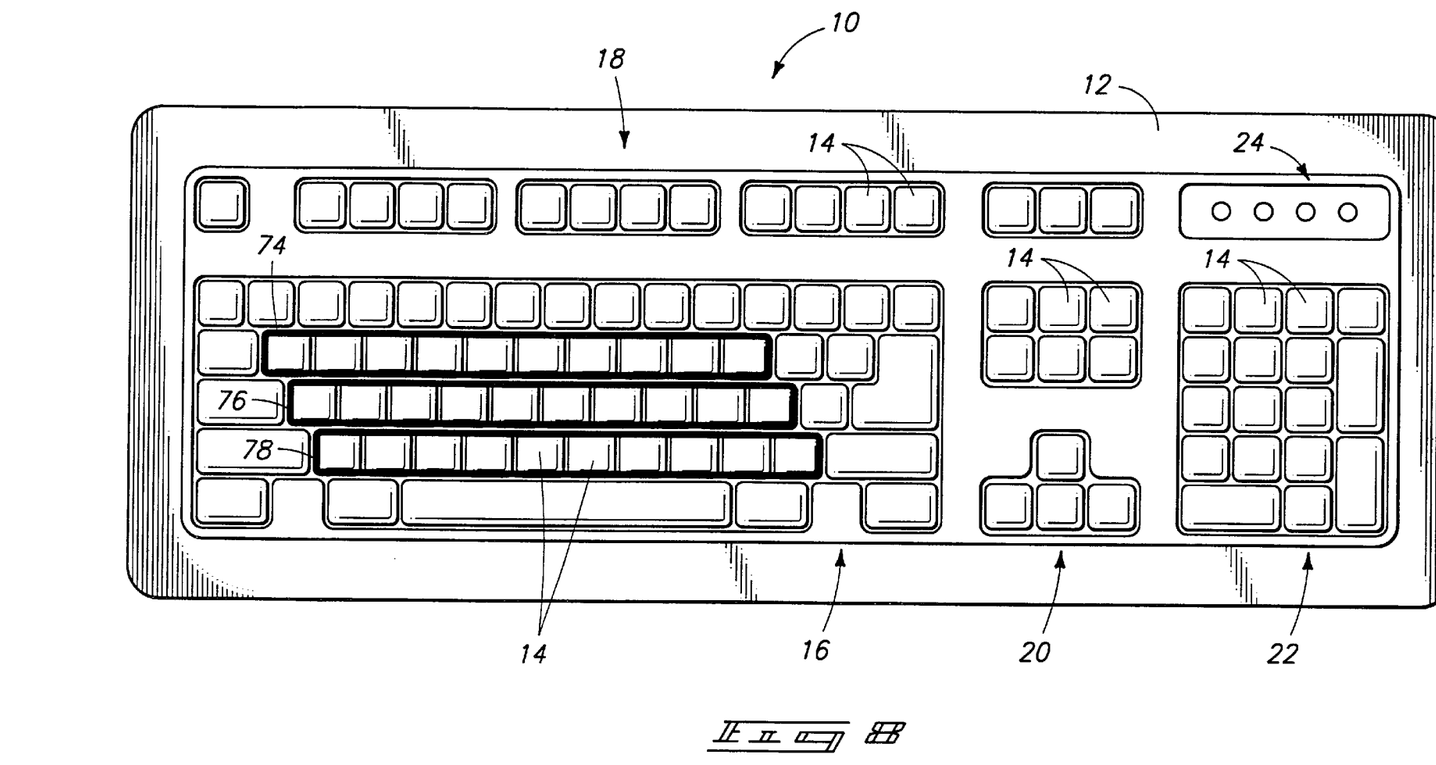
FIG. 8 is a plan view of a computer keyboard system incorporating the present invention and showing a different grouping of keys in a computer keyboard array of keys.

In accordance with a preferred aspect of the invention, and in light of the above discussion, at least two of the groups and preferably each of the first through fourth groups of keys have a different associated predetermined threshold duration value or first value. Such stems from the fact that different muscle groups control the individual fingers with which the key groups are associated. Other grouping schemes are possible. For example, FIG. 8 shows one such grouping scheme in which keys are arranged in sub-groups 74, 76, and 78. Such sub-groups are delineated according to row. FIG. 9 shows a different exemplary key grouping in which keys are arranged in sub-groups 80, 82. Such groups are delineated in accordance with which operator hand (left or right) supports the fingers normally used to depress the associated keys. In the example, sub-group 80 constitutes keys which are normally depressed by the fingers on an operator's left hand, whereas sub-group 82 constitutes keys which are normally depressed using fingers on an operator's right hand.

Figure 10:
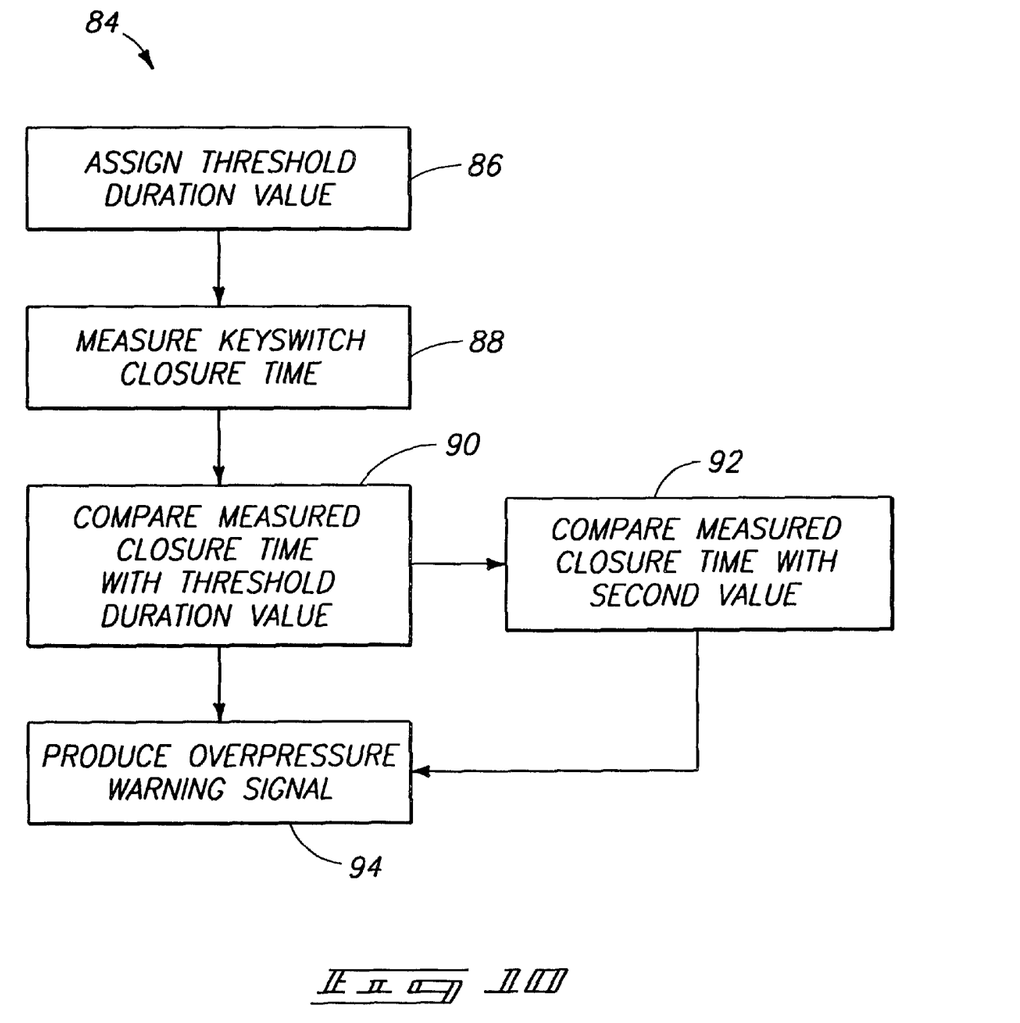
FIG. 10 is a flow chart which illustrates certain methodical aspects of the present invention.

Referring to FIG. 10, certain methodical aspects of the invention are set forth in a flow diagram indicated generally at 84. At step 86, at least some individual keys 14 are assigned a threshold duration value. Such values can be, and preferably are stored in suitable memory which is accessible by the microprocessor described above. As mentioned above, a look-up table can be used to store a variety of different values. An assigned threshold duration value corresponds to a value which can be utilized by the microprocessor to detect an overpressure force condition. In accordance with one aspect of the invention, each key of the plurality of keys is assigned a separate threshold duration value. Threshold duration values can be the same or different as between the different keys. Additionally, different groups of keys can be defined, as discussed in connection with FIGS. 7–9, and assigned threshold duration values can be different for one or more of the groups of keys. At step 88, an amount of time corresponding to the keyswitch closure time is measured. The measured amount of time is then, at step 90, compared by the microprocessor with the corresponding threshold duration value stored in memory. In one implementation, if the measured keyswitch closure times are greater than the threshold duration values, an overpressure warning signal is produced at step 94. In accordance with another implementation of the invention, the measured keyswitch closure time is compared with a second value which is greater than the threshold duration value. As discussed above, such second value preferably constitutes a value associated with a repeat key function. Accordingly, if the keyswitch closure time is, at step 92, less than the second value and greater than the threshold duration value, an overpressure warning signal is produced for a keyboard operator.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer keyboard system comprising:
   a plurality of keys arranged in a keyboard array, individual keys being capable of reciprocation by a keyboard operator through a keystroke range comprising an undepressed position and an actuation position;
   a plurality of keyswitches, individual keyswitches being operably associated with individual respective keys for generating a computer input signal when the keyboard operator applies an actuation force sufficient to move an individual key from the undepressed position to the actuation position, the actuation position corresponding to closure of an associated keyswitch;
   a keyswitch monitor operably connected with the plurality of keyswitches and configured to determine a keyswitch closure duration value upon closure of an associated keyswitch, the keyswitch monitor being further configured to generate an overpressure signal if the keyswitch closure duration value exceeds a predetermined threshold duration value for the associated keyswitch; and
   a sensory warning device operably connected with the keyswitch monitor and configured to receive the overpressure signal and responsive thereto warn the keyboard operator that excessive force has been applied to a key.

2. The keyboard system of claim 1, wherein the predetermined threshold duration value is less than a repeat key duration value.

3. The keyboard system of claim 1, wherein the keyswitch monitor comprises a microprocessor for comparing keyswitch closure duration values with predetermined threshold duration values.

4. The keyboard system of claim 1, wherein at least two keys have different associated predetermined threshold duration values.

5. The keyboard system of claim 1, wherein at least two keys have different associated predetermined threshold duration values and wherein the keyswitch monitor comprises a microprocessor for comparing keyswitch closure duration values with associated predetermined threshold duration values.

6. The keyboard system of claim 1, wherein the plurality of keys are arranged in at least two groups within the keyboard array, and individual groups have different associated predetermined threshold duration values.

7. The keyboard system of claim 1, wherein:
   the plurality of keys are arranged in at least two groups within the keyboard array, and individual groups have different associated predetermined threshold duration values; and
   wherein the keyswitch monitor comprises a microprocessor for comparing keyswitch closure duration values with associated predetermined threshold duration values.

8. The keyboard system of claim 1, wherein the keyswitch monitor comprises:
   memory comprising a look-up table; and
   a microprocessor for comparing keyswitch closure duration values with associated predetermined threshold duration values, wherein at least two keys have different associated predetermined threshold duration values which are stored in the look-up table and used by the microprocessor for comparing keyswitch closure duration values.

9. The keyboard system of claim 1, wherein:
   the plurality of keys has an alphanumeric section having a first group of keys that are normally depressed by the operator's index fingers, a second group of keys that are normally depressed by the operator's middle fingers, a third group of keys that are normally depressed by the operator's ring fingers, and a fourth group of keys that are normally depressed by the operator's little fingers and wherein at least two of the groups have different associated predetermined threshold duration values; and
   the keyswitch monitor comprises:
   memory comprising a look-up table; and
   a microprocessor for comparing keyswitch closure duration values with predetermined threshold duration values, predetermined threshold duration values being stored in the look-up table and used by the microprocessor for comparing keyswitch closure duration values.

10. A computer keyboard system comprising:

a keyboard housing;

a plurality of keys operably mounted within the housing and configured for reciprocation by a keyboard operator through a keystroke range which includes an undepressed position, an actuation position, and an overtravel subrange;

a plurality of keyswitches, individual keyswitches being operably associated with individual respective keys for generating a computer input signal when the keyboard operator applies an actuation force sufficient to move an individual key from the undepressed position to the actuation position, the actuation position corresponding to closure of an associated keyswitch;

an overtravel monitor operatively connected with the plurality of keys and configured to measure an amount of time which corresponds to a time period during which an individual key is disposed within the overtravel subrange, the overtravel monitor further being configured to generate an overpressure signal if the measured amount of time is greater than a first value and less than a second value; and a sensory warning device configured to receive the overpressure signal and warn the keyboard operator that excessive force has been applied to a key.

11. The keyboard system of claim 10, wherein the overtravel subrange corresponds to a key position generally beyond the actuation position.

12. The keyboard system of claim 10, wherein at least some of the keys are assigned associated first values, and at least some of the first values are different.

13. The keyboard system of claim 10, wherein each key is assigned associated first values, and at least some of the first values are different.

14. The keyboard system of claim 10, wherein the second value corresponds to a value associated with a repeat key function.

15. The keyboard system of claim 10, wherein the overtravel monitor comprises memory for storing a plurality of first values and individual keys are assigned corresponding first values which are stored in memory, at least some of the first values being different.

16. The keyboard system of claim 10, wherein the overtravel monitor comprises:

memory for storing a plurality of first values and individual keys are assigned a corresponding first value which is stored in memory, at least some of the first values being different; and a microprocessor for comparing the measured amounts of time with the first and second values.

17. The keyboard system of claim 10, wherein:

the plurality of keys are arranged in at least two groups and individual groups of keys are assigned different associated first values; and the overtravel monitor comprises a microprocessor for comparing measured amounts of time with the first and second values.

18. The keyboard system of claim 10, wherein the plurality of keys has an alphanumeric section having a first group of keys that are normally depressed by the operator's index fingers, a second group of keys that are normally depressed by the operator's middle fingers, a third group of keys that are normally depressed by the operator's ring fingers, and a fourth group of keys that are normally depressed by the operator's little fingers and wherein at least two of the groups have different associated first values; and the overtravel monitor comprises:

memory comprising a look-up table in which the associated first values are stored; and a microprocessor for comparing measured amounts of time with associated first values.

19. A computer keyboard system comprising:

a keyboard housing;

a plurality of keys arranged in a keyboard array within the keyboard housing and wherein the array has an alphanumeric section in which the plurality of keys are arranged in at least two different groups and each group comprises different keys;

wherein individual keys are capable of reciprocation by a keyboard operator through a keystroke range comprising an undepressed position and an actuation position;

a plurality of keyswitches, individual keyswitches being operably associated with individual respective keys for generating a computer input signal when the keyboard operator applies an actuation force sufficient to move an individual key from the undepressed position to the actuation position, the actuation position corresponding to closure of an associated keyswitch;

a microprocessor configured to determine a keyswitch closure duration value which corresponds to an amount of time during which a keyswitch is closed, compare the keyswitch closure duration value with a threshold duration value for the key, and generate an overpressure signal if the keyswitch closure duration value is greater than the threshold duration value for the key; and a sensory warning device operably connected with the microprocessor and configured to receive the overpressure signal and responsive thereto warn the keyboard that excessive force has been applied to the key.

20. The keyboard system of claim 19, wherein the keys are arranged in groups according to which operator finger is normally used depress the keys.

21. The keyboard system of claim 19, wherein the keys are arranged in groups in accordance with the row in which a key appears.

22. The keyboard system of claim 19, wherein the keys are arranged in groups according to which operator hand supports the fingers normally used to depress the associated keys.

23. The keyboard system of claim 19, wherein the keystroke range through which a key may be reciprocated comprises an overtravel subrange which is generally beyond the actuation position and away from the undepressed position, and wherein the keyswitch closure duration value corresponds with an amount of time during which a key is disposed within the overtravel subrange.

24. The keyboard system of claim 19 further comprising memory and a look-up table in the memory for holding a plurality of threshold duration values.

25. In a computer keyboard system, a method of determining whether overpressure has been applied by a keyboard operator to a key in an array comprising a plurality of keys in the system, the method comprising the steps of:

assigning at least some individual keys a threshold duration value which corresponds to a duration of time a corresponding associated keyswitch can be closed by an individual key;

measuring an amount of time which corresponds to a duration of time a corresponding associated keyswitch is actually closed by an individual key;

comparing the measured amount of time with the corresponding threshold duration value; and producing an operator-discernable overpressure warning signal that warns the operator that excessive force has been applied to a key if the measured amount of time exceeds the corresponding threshold duration value.

26. The method of claim 25, wherein the assigning step comprises assigning different threshold duration values for the at least some individual keys.

27. The method of claim 25, wherein the assigning step comprises assigning each key of the plurality of keys a separate threshold duration value.

28. The method of claim 25, wherein the assigning step comprises assigning each key of the plurality of keys a separate threshold duration value, at least some of the separate threshold duration values being different.

29. The method of claim 25, wherein:
the comparing step further comprises comparing the measured amount of time with a second value which is greater than the threshold duration value; and
the producing step further comprises producing the overpressure warning signal if the measured amount of time is less than the second value.

30. The method of claim 25 further comprising defining at least two groups of keys wherein individual groups comprise different keys, and wherein the assigning step comprises assigning a different threshold duration value to the two groups of keys.

31. The method of claim 25 further comprising defining a first group of keys that are normally depressed by the operator's index fingers, a second group of keys that are normally depressed by the operator's middle fingers, a third group of keys that are normally depressed by the operator's ring fingers, and a fourth group of keys that are normally depressed by the operator's little fingers; and
wherein the assigning step comprises assigning a different threshold duration value to at least two of the groups of keys.

32. The method of claim 25, wherein the assigning step comprises providing memory and storing the threshold duration values in memory.

33. The method of claim 25, wherein the measuring and comparing steps are accomplished by a microprocessor.

34. The method of claim 25, wherein:
the assigning step comprises providing memory and storing the threshold duration values in memory; and
the measuring and comparing steps are accomplished by a microprocessor.

35. The method of claim 25 further comprising:
defining at least two groups of keys wherein individual groups comprise different keys, and wherein:
the assigning step comprises providing memory and storing the threshold duration values in memory, the threshold duration values being different for each group of keys;
the comparing step further comprises comparing the measured amount of time with a second value which is greater than any of the threshold duration values; and
the producing step further comprises producing the overpressure warning signal if the measured amount of time is less than the second value.

36. The method of claim 25 further comprising:
defining a first group of keys that are normally depressed by the operator's index fingers, a second group of keys that are normally depressed by the operator's middle fingers, a third group of keys that are normally depressed by the operator's ring fingers, and a fourth group of keys that are normally depressed by the operator's little fingers, and wherein:
the assigning step comprises providing memory and storing the threshold duration values in memory, the threshold duration values being different for each group of keys;
the comparing step further comprises comparing the measured amount of time with a second value which is greater than any of the threshold duration values; and
the producing step further comprises producing the overpressure warning signal if the measured amount of time is less than the second value.

* * * * *